US011343053B2

(12) United States Patent
Wong et al.

(10) Patent No.: US 11,343,053 B2
(45) Date of Patent: May 24, 2022

(54) COMMUNICATIONS DEVICES, INFRASTRUCTURE EQUIPMENT AND METHODS

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB); Kazuyuki Shimezawa, Basingstoke (GB)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 16/764,397

(22) PCT Filed: Nov. 15, 2018

(86) PCT No.: PCT/EP2018/081402
§ 371 (c)(1),
(2) Date: May 15, 2020

(87) PCT Pub. No.: WO2019/096921
PCT Pub. Date: May 23, 2019

(65) Prior Publication Data
US 2020/0280422 A1 Sep. 3, 2020

(30) Foreign Application Priority Data

Nov. 17, 2017 (EP) .................................... 17202456

(51) Int. Cl.
*H04L 5/00* (2006.01)
*H04L 27/26* (2006.01)
*H04W 72/04* (2009.01)

(52) U.S. Cl.
CPC .......... *H04L 5/0091* (2013.01); *H04L 5/0053* (2013.01); *H04L 27/2636* (2013.01); *H04W 72/042* (2013.01); *H04W 72/0453* (2013.01)

(58) Field of Classification Search
CPC . H04L 5/0091; H04L 5/0053; H04L 27/2636; H04W 72/042; H04W 72/0453
See application file for complete search history.

(56) References Cited

U.S. PATENT DOCUMENTS

2006/0045197 A1* 3/2006 Ungerboeck ....... H04L 27/3427
375/261
2011/0013615 A1 1/2011 Lee et al.
(Continued)

FOREIGN PATENT DOCUMENTS

WO 2018/172403 A1 9/2018

OTHER PUBLICATIONS

International Search Report and Written Opinion dated Mar. 19, 2019 for PCT/EP2018/081402 filed on Nov. 15, 2018, 16 pages.
(Continued)

*Primary Examiner* — Duc C Ho
(74) *Attorney, Agent, or Firm* — Xsensus LLP

(57) ABSTRACT

A communications device for use in a wireless communications system comprising an infrastructure equipment and the communications device is provided. The communications device is configured to transmit an uplink channel to the infrastructure equipment in a plurality of allocated subcarriers. The communications device comprises circuitry for one or more modulation symbol repetition blocks, each configured to receive modulated symbols mapped to one of plurality of modulated symbol sets and to repeat each of the received modulated symbols within each of the plurality of modulated symbol sets, and circuitry for a precoder block configured to carry out a precoder function on the repeated modulation symbols, the precoder function comprising multiplying each of the repeated modulation symbols by an element of a precoder vector to produce precoded symbols.

18 Claims, 10 Drawing Sheets

(56) References Cited

U.S. PATENT DOCUMENTS

2011/0199982 A1\* 8/2011 Tee .................. H04W 72/0406
370/328
2012/0027004 A1 2/2012 Ko et al.
2017/0134129 A1 5/2017 You et al.

OTHER PUBLICATIONS

Holma, H. and Toskala, A., "LTE for UMTS OFDMA and SC-FDMA based radio access," John Wiley and Sons, 2009, pp. 25-27.
Sierra Wireless, "PUSCH Spectral Efficiency Solution Analysis," 3GPP TSG RAN WG1 Meeting #90, R1-1714108, Prague, Czech Republic, Aug. 21-25, 2017, 4 pages.
Ericsson, "Revised WID for Further Enhanced MTC for LTE," 3GPP TSG RAN Meeting #73, RP-161464, revision of RP-161321, New Orleans, USA, Sep. 19-22, 2016, 6 pages.
Huawei and Hisilicon, "Revised work item proposal: Enhancements of NB-IoT," 3GPP TSG RAN Meeting #73, RP-161901, revision of RP-161324, New Orleans, USA, Sep. 19-22, 2016, 7 pages.
Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.
Huawei et al., "New WID on Further NB-IoT enhancements ," #3GPP TSG RAN Meeting #75, RP-170852, Dubrovnik, Croatia, Mar. 6-9, 2017, 6 pages.

\* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2018/081402, filed Nov. 15, 2018, which claims priority to EP17202456.4, filed Nov. 17, 2017, the entire contents of each are incorporated herein by reference.

BACKGROUND

Field of Disclosure

The present disclosure relates to infrastructure equipment and communications devices of wireless communications systems, where the communications devices and/or infrastructure equipment are configured to apply a precoder to repeated modulation symbols to modify the subcarriers used for transmission.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently, there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4].

At least some devices making use of these technologies are expected to be low complexity and inexpensive devices requiring relatively infrequent communication of relatively low bandwidth data. Low power consumption may be a particularly important consideration for these types of device, for example because they are small devices having correspondingly small batteries or because they remotely located without ready access to external power. While a desire for low power consumption may be a particularly important consideration for such devices compared to other devices, it will nonetheless be appreciated that approaches that help reduce power consumption can be useful for all types of terminal device.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a communications device for use in a wireless communications system comprising an infrastructure equipment and the communications device. The communications device is configured to transmit an uplink channel to the infrastructure equipment in a plurality of allocated subcarriers. The communications device comprises circuitry for one or more modulation symbol repetition blocks, each configured to receive modulated symbols mapped to one of a plurality of modulated symbol sets and to repeat each of the received modulated symbols within each of the plurality of modulated symbol sets, and circuitry for a precoder block configured to carry out a precoder function on the repeated modulation symbols, the precoder function comprising multiplying each of the repeated modulation symbols by an element of a precoder vector to produce precoded symbols.

Embodiments of the present technique, which further relate to infrastructure equipment, methods of operating communications devices and infrastructure equipment and circuitry for communications devices and infrastructure equipment, allow for a precoder to be applied to the repeated modulation symbols to enable a transmitter to modify the subcarriers used for transmission. In some embodiments, this enables single subcarrier transmission.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Wireless Communications System (4G)

Figure 1:
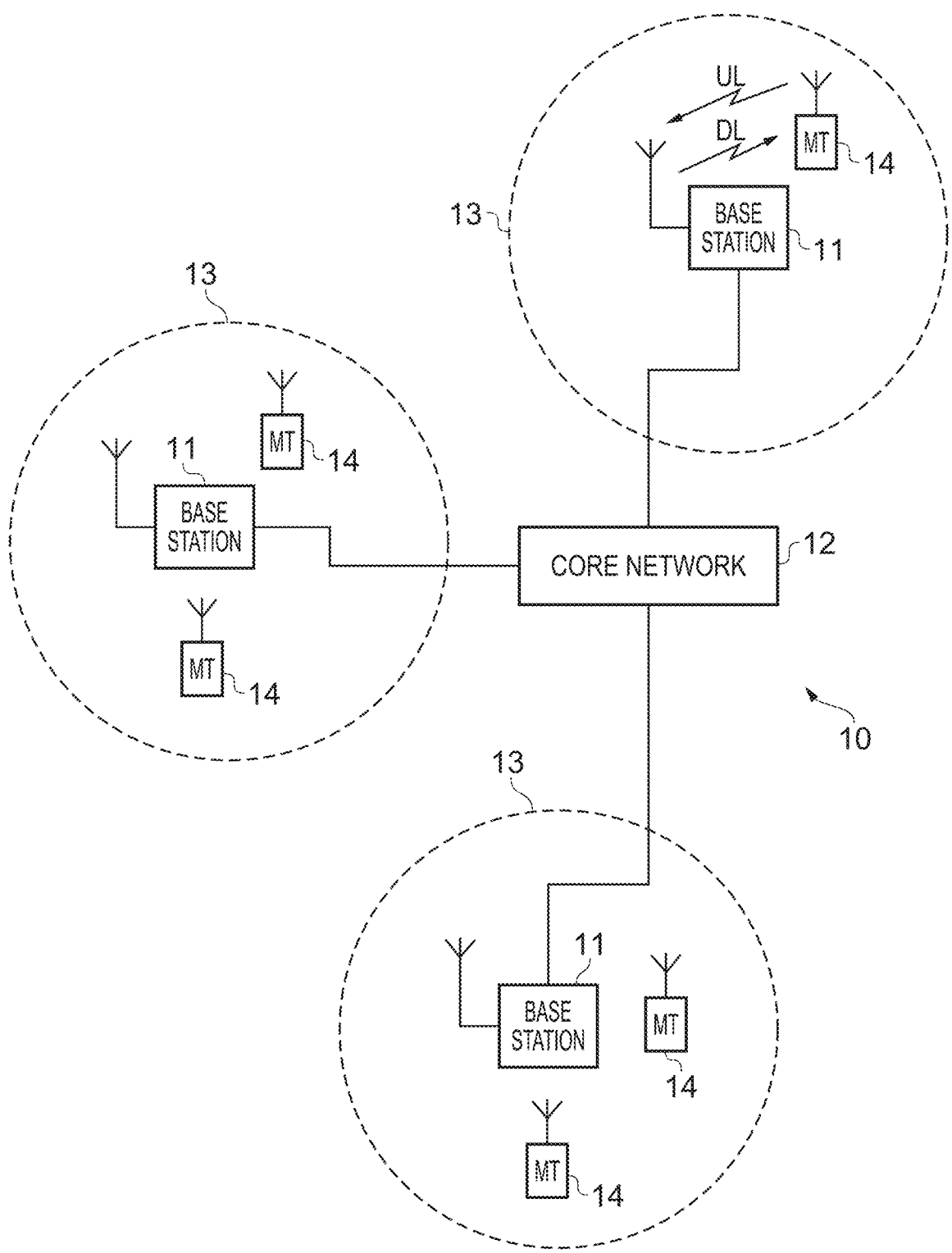
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
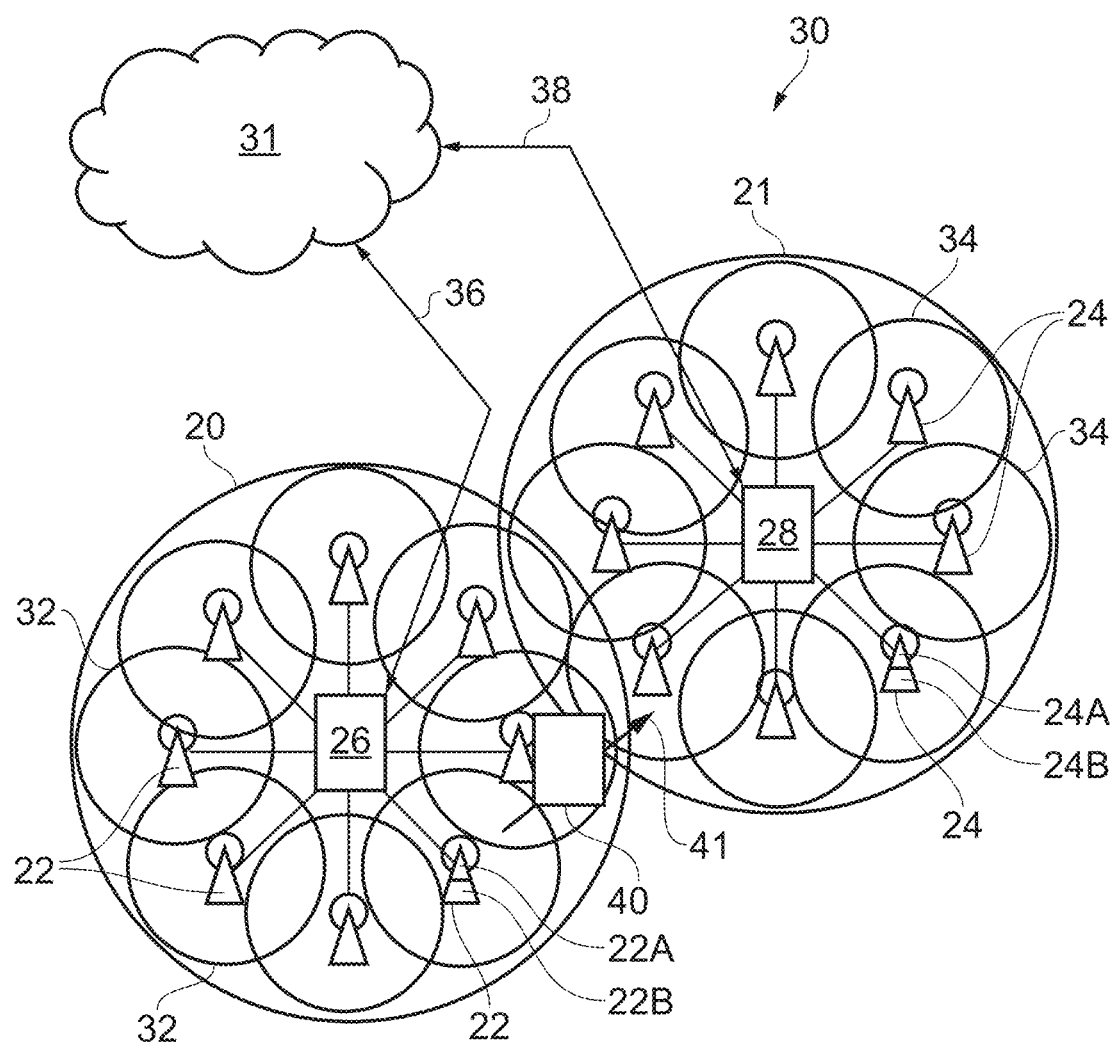
FIG. 2 schematically represents some aspects of a new radio access technology (RAT) wireless telecommunication system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 40 is represented in FIG. 2 within the coverage area of the first communication cell 20. This terminal device 40 may thus exchange signaling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Sub-PRB Transmission

Figure 3:
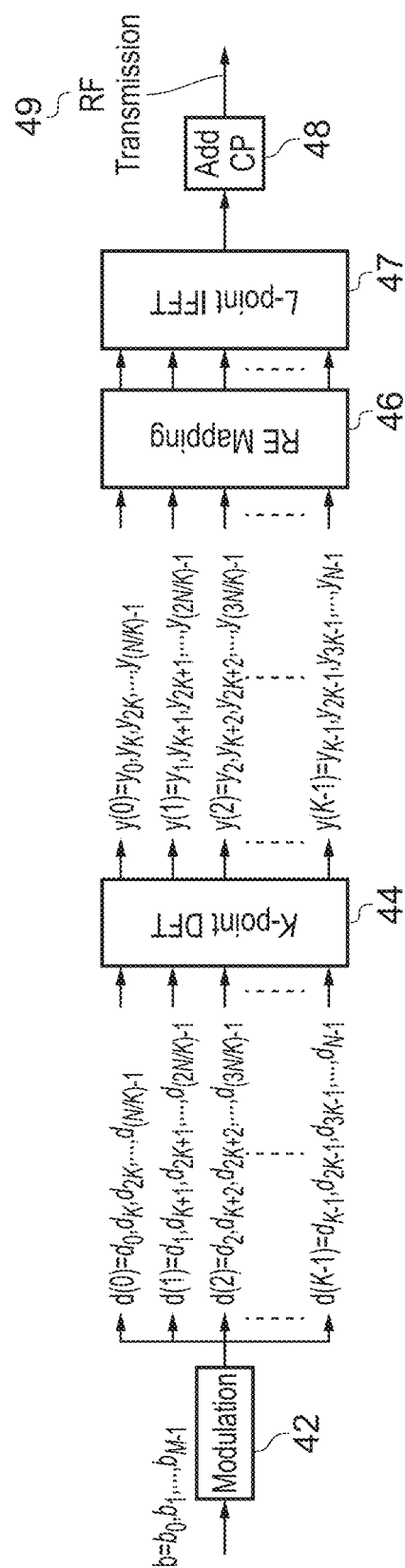
FIG. 3 schematically shows an example of a single layer PUSCH transmission using SC-FDMA.

In the current LTE and eMTC systems, the PUSCH is transmitted using SC-FDMA. FIG. 3 shows a single layer (i.e. no MIMO) PUSCH transmission employing SC-FDMA. The channel bits $b=\{b_0, b_1, \ldots b_{M-1}\}$ (i.e. coded and scrambled information bits) go through modulation 42 (e.g. QPSK, 16QAM, 64QAM) in which the modulated symbols $d=\{d_0, d_1, \ldots, d_{N-1}\}$ are divided into K sets of modulation symbols, where K is the number of subcarriers that the PUSCH transmission occupies. These K sets of symbols $\{d(0), d(1), \ldots, d(K-1)\}$ go through a K-point DFT 44 (Discrete Fourier Transform). The K sets of transformed symbols {y(0), y(1), . . . , y(K−1)} are mapped to the appropriate REs 46 (resource elements, i.e. subcarriers and OFDM symbol matrix) and then passed through an L-point iFFT 47 (inverse Fast Fourier Transform) to generate the SC-FDMA signal where a Cyclic Prefix is added 48 prior to RF transmission 49.

Figure 4:
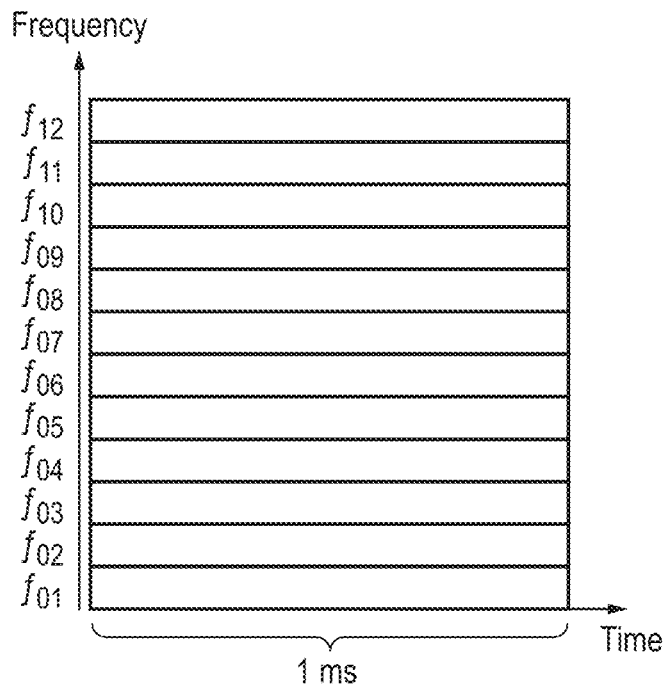
FIG. 4 illustrates an example of a Physical Resource Block (PRB)

One of the objectives of efeMTC WI is to improve the spectral efficiency of the PUSCH uplink transmission [3]. An identified method is to use less than one PRB (Physical Resource Block) for PUSCH transmission (this is termed "sub-PRB transmission"). In LTE and eMTC, a PRB consists of 12 subcarriers with 15 kHz subcarrier spacing in the frequency domain and 7 symbols in the time domain. A PRB pair consists of two consecutive PRBs in one subframe and spans 1 ms in the time domain as shown in FIG. 4 and it is the smallest resource that a PUSCH (and PDSCH) transmission can occupy. The identified sub-PRB transmission therefore allows the PUSCH to occupy less than 12 subcarriers (likely to be 3 or 6 subcarriers).

The main benefits of sub-PRB transmission in the uplink are:

Power Spectral Density (PSD) boosting. The limited UE transmission power can be concentrated into fewer subcarriers, i.e. frequency resources, thereby increasing the power per sub-carrier thereby increasing the PSD. It has been shown, especially for coverage enhancement operations (where the UE operates outside of the coverage of a legacy LTE cell) that for the same TBS (Transport Block Size), reducing the number of PUSCH subcarriers, reduces the number of repetitions required for PUSCH [6] due to improved PSD on the DMRS (demodulation reference symbols) and data. This directly leads to lower power consumption and less PUSCH resource usage.

Reduced Peak to Average Power Ratio (PAPR). The PAPR of a signal affects the amount of power backoff at the UE's power amplifier (PA) to avoid clipping of the peaks of a signal. PA power backoff reduces the maximum transmit power of a UE, which reduces the PSD of the signal and reduces the efficiency of the PA. Reducing the PAPR would reduce the amount of PA power backoff required of a UE and hence increases the maximum transmit power. This will also improve the efficiency of the PA since the PA is allowed to transmit at a higher power.

3GPP is currently discussing the number of subcarriers that can be allocated for PUSCH. Although 1 subcarrier transmission is highly beneficial in terms of PSD and PAPR, it is unlikely to be specified in Rel-15. It is expected that the lowest number of subcarriers for PUSCH transmission will be either 2 or 3. Therefore, there is motivation to improve the PAPR of the PUSCH Sub-PRB transmission using more than 1 subcarrier, ideally to be as good as 1 subcarrier.

Figure 5:
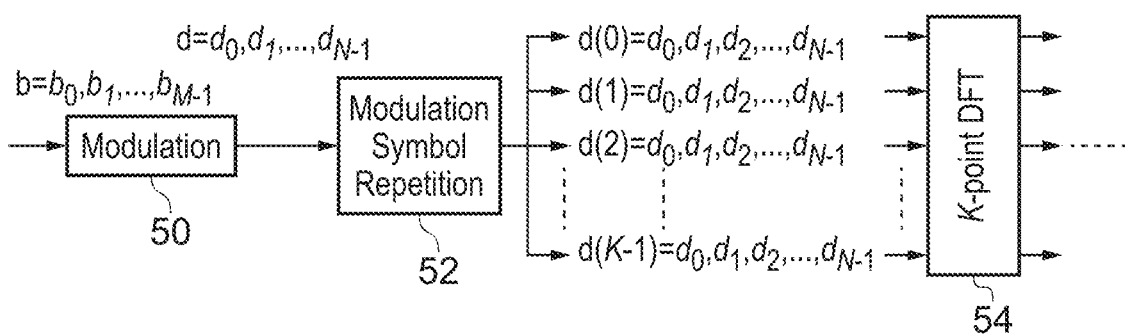
FIG. 5 schematically demonstrates an example of modulation symbol repetition.

It has been proposed to use modulation symbol repetition as a method to reduce PAPR for multi-subcarrier transmission. In such a method, the modulated symbols are repeated across the (K) sets of modulated symbols prior to DFT operations. That is, a modulation symbol repetition process is added between the modulation and DFT processes as shown in FIG. 5, in which symbols are first modulated 50, repeated across the allocated subcarriers 52, and subjected to a DFT 54. By having the same symbols repeated across all the allocated PUSCH subcarriers, a single subcarrier transmission would be emulated and hence improvement of the PSD and PAPR of the signals towards that of a single subcarrier transmission could be achieved. It should be noted that the number of modulation symbols that can be carried in an OFDM symbol is reduced compared to the number that can be carried by a native single subcarrier transmission (K tones are used to transmit one repeated modulation symbol, whereas for a native single subcarrier transmission, one tone is used to transmit one modulation symbol).

Modulation Symbol Repetition and Precoding for eMTC

Embodiments of the present technique can provide a communications device for use in a wireless communications system comprising an infrastructure equipment and the communications device, the communications device being configured to transmit an uplink channel to the infrastructure equipment in a plurality of allocated subcarriers, wherein the communications device comprises circuitry for one or more modulation symbol repetition blocks, each configured to receive modulated symbols mapped to one of a plurality of modulated symbol sets and to repeat each of the received modulated symbols within each of the plurality of modulated symbol sets, and circuitry for a precoder block configured to carry out a precoder function on the repeated modulation symbols, the precoder function comprising multiplying each of the repeated modulation symbols by an element of a precoder vector to produce precoded symbols.

It would be appreciated that, in many arrangements of the above described wireless communications system, the infrastructure equipment and communications device comprise a transmitter (or transmitter circuitry), a receiver (or receiver circuitry), and a controller (or controller circuitry). Each of the controllers may be, for example, a microprocessor, a CPU, or a dedicated chipset, etc.

In embodiments of the present technique, a DFT process is carried out either before, or after the precoder process. In other words, the communications device comprises circuitry for a discrete Fourier transform, DFT, block configured either to carry out a DFT on the precoded symbols such that, at the output of the DFT, only the precoded and transformed symbols in a selected one of the allocated subcarriers have a non-zero magnitude, or to carry out a DFT on the repeated modulation symbols before the precoder function is carried out such that, at the output of the precoder function, only the precoded and transformed symbols in a selected one of the allocated subcarriers have a non-zero magnitude. In embodiments of the present technique, the communications device is then configured to transmit the uplink channel (PUSCH) comprising the precoded and transformed symbols (after the precoder and DFT) in the selected one of the allocated subcarriers having the non-zero magnitude to the infrastructure equipment.

Figure 6:
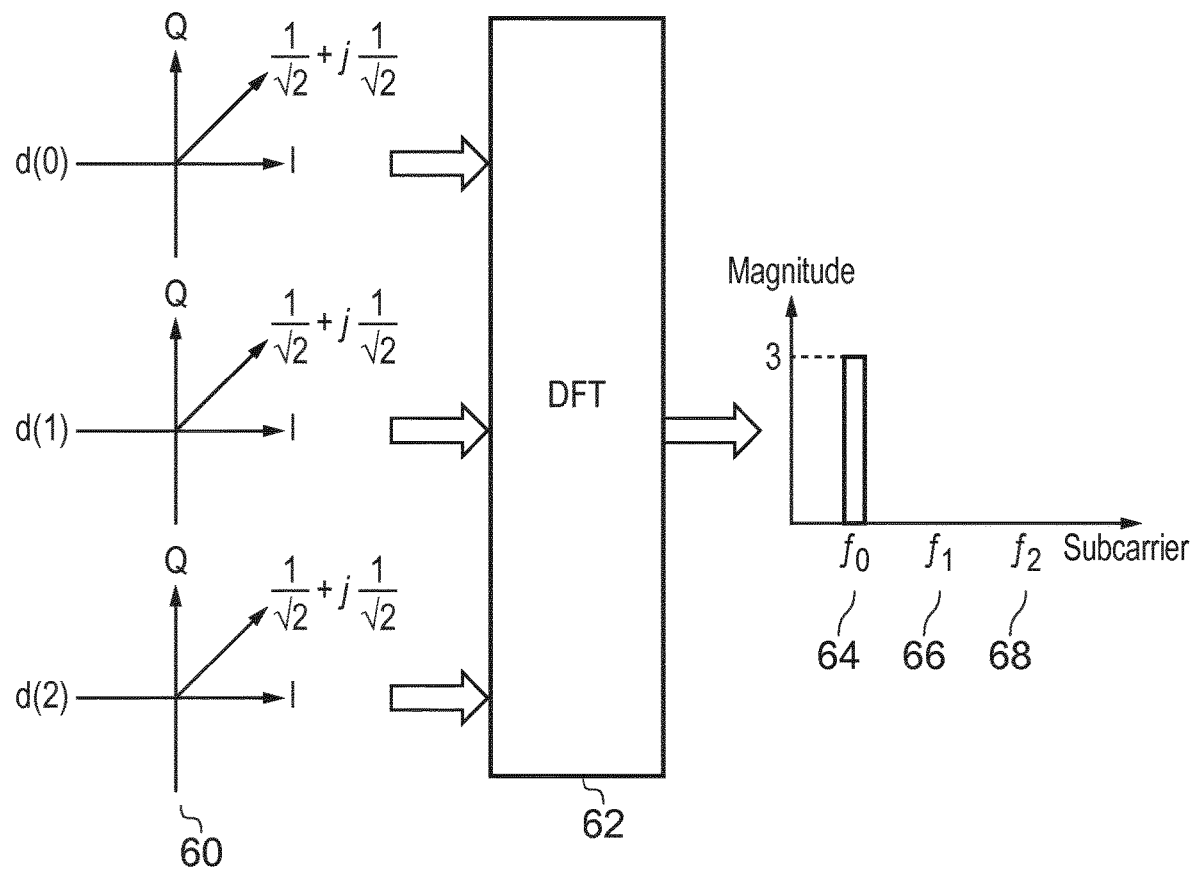
FIG. 6 illustrates a schematic and graphical example of modulation symbol repetition and precoding an output of a Discrete Fourier Transform (DFT) output FIG. 7 schematically illustrates an exemplary precoder process after modulation symbol repetition in accordance with embodiments of the present technique.

When modulation symbol repetition is performed it is observed that the all the energy at the output of the DFT process is concentrated in the $1^{st}$ subcarrier. An example where the PUSCH occupies 3 subcarriers and using QPSK is shown in FIG. 6, where a particular symbol 60 at a QPSK constellation point $$\frac{1}{\sqrt{2}} + j\frac{1}{\sqrt{2}}$$

is repeated across all K sets of modulated symbols prior to the 3 point DFT process 62. The output of the DFT only has a non-zero magnitude at the first subcarrier 64 whilst the other subcarriers 66, 68 have zero magnitude. That is to say, the output emulates a single subcarrier. Other constellation points would produce the same result, i.e. all energy is concentrated on the 1$^{st}$ subcarrier.

Although the modulation symbol repetition is able to create a single carrier transmission, that transmission is restricted to only the 1$^{st}$ subcarrier of the multi subcarrier PUSCH. Recognising this drawback, embodiments of the present disclosure introduce a precoding process between the modulation and DFT processes. The precoder function is used to direct the energy of the output of the DFT such that it falls upon a selected subcarrier. That is to say the said precoder can be used to select the single subcarrier for PUSCH transmission. Hence, this enables the eNB scheduler to multiplex different multi-subcarrier PUSCH transmissions from different UEs.

In some embodiments of the present technique, a codebook containing a set of precoders where each precoder corresponds to a different subcarrier of the allocated subcarriers for the PUSCH is used. An example codebook is shown in Table I for a 3-subcarrier PUSCH allocation. The eNB can therefore indicate to the UE which precoder to use depending on which subcarrier the eNB scheduler wants the PUSCH transmission to occur. It should be appreciated that Table I is an example codebook structure with 3 subcarriers and this can be extended to a different number of subcarriers (e.g. 2, 6, 9).

TABLE I

Example codebook structure for 3 subcarrier PUSCH allocation

| Codebook Index | Target Subcarrier | Precoder |
|---|---|---|
| 0 | 0 | $P_0$ |
| 1 | 1 | $P_1$ |
| 2 | 2 | $P_2$ |

Figure 7:
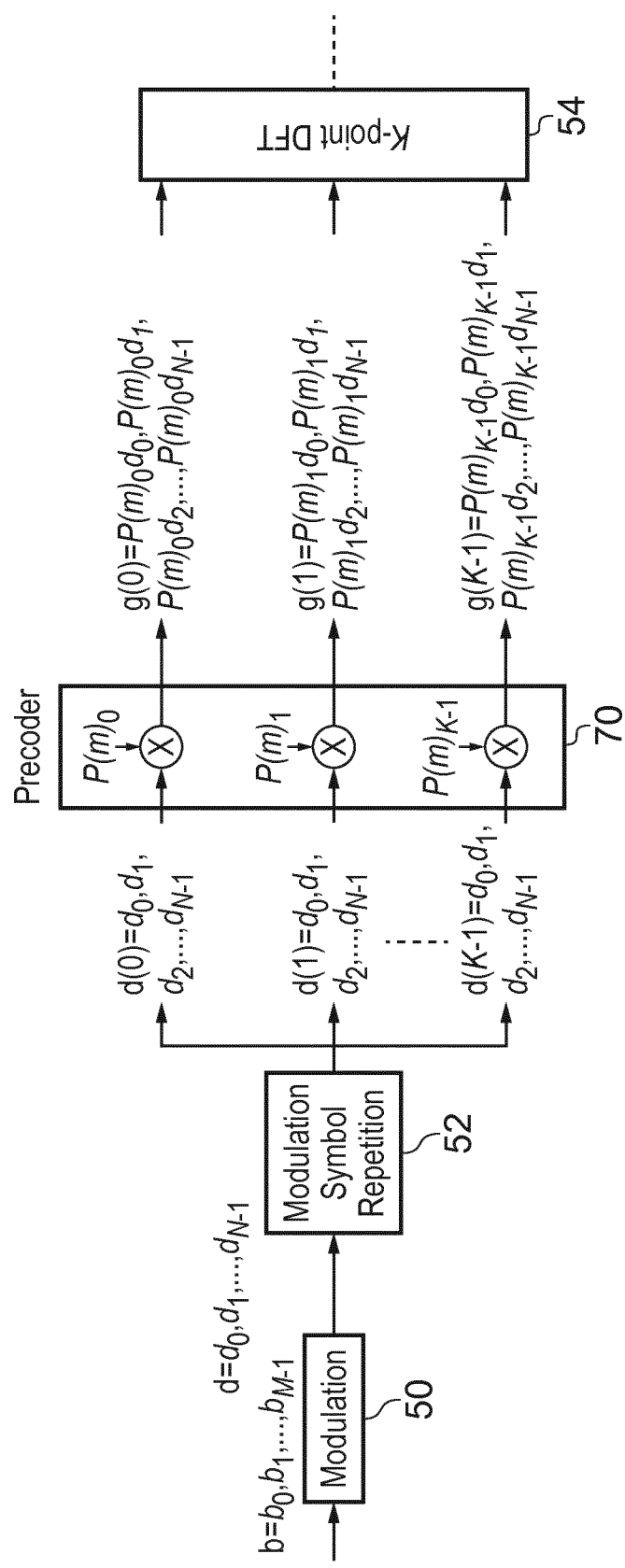

In some embodiments of the present technique, the precoder process is introduced after the modulation symbol repetition process as shown in FIG. 7, which is a modified version of the schematic and process shown by FIG. 5. That is, the precoder 70 is a vector of complex numbers, i.e. for Precoder m (where m is the index to the codebook) is $P_m = \{P(m)_0, P(m)_1, \ldots, P(m)_{K-1}\}$. Hence, each modulation symbol is multiplied by an element of this precoding vector, such that the output of the precoder G={g(0), g(1), g(2), ..., g(K-1)}={P(m)$_0$d(0), P(m)$_1$d(1), P(m)$_2$d(2), ..., P(m)$_{K-1}$d(K-1)}. It should be appreciated, as described above, that the pre-coding can be implemented by adopting a post-coding after the DFT which comprises convolving the DFT output (D) of the repeated modulation symbols d with the DFT of the precoding vector P.

An example precoder for codebook m is $$P_m = \left\{1, e^{j\frac{2\pi m}{K}}, e^{j\frac{2\pi 2m}{K}}, e^{j\frac{2\pi 3m}{K}}, \ldots, e^{j\frac{2\pi(K-1)m}{K}}\right\}.$$

For a 3 subcarrier PUSCH allocation example, the precoder vectors are shown in Table 11. It should be appreciated that this is only one example precoder and other precoders can be used for example a rotated version of this example precoder can also be used, e.g.

$$P_m = \left\{e^{j\frac{2\pi m}{K}}, e^{j\frac{2\pi 2m}{K}}, e^{j\frac{2\pi 3m}{K}}, \ldots, e^{j\frac{2\pi(K-1)m}{K}}, 1\right\}$$

but this has an effect where the modulation symbol on the target subcarrier is also transformed (e.g. rotated).

TABLE II

Example precoders for 3 subcarrier codebook

| Codebook Index, m | Target Subcarrier | Precode |
|---|---|---|
| 0 | 0 | $P_0 = \{1, 1, 1\}$ |
| 1 | 1 | $P_1 = \{1, e^{j\frac{2\pi}{3}}, e^{j\frac{4\pi}{3}}\}$ |
| 2 | 2 | $P_2 = \{1, e^{j\frac{4\pi}{3}}, e^{j\frac{8\pi}{3}}\}$ |

In some embodiments of the present technique, the codebook is RRC configured by the network. The UE may be configured with multiple codebooks, one for each of a different number of allocated subcarriers. For example, the eNB may configure the UE with a codebook of 3 sets of precoders for PUSCH with 3 subcarriers allocation and another codebook of 6 sets of precoders for PUSCH with 6 subcarriers allocation. The DCI would indicate the number of subcarriers allocated for the PUSCH and this would indirectly indicate which codebook to use. That is if the DCI schedules the UE with 3 subcarriers, then the codebook with 3 sets of precoders is used. In other words, in these embodiments, the communications device is configured to receive an indication of the precoder vector via received radio resource control information and/or received downlink control information, the elements of the indicated precoder vector being determined such that their multiplication by the repeated modulation symbols results in the selected one of the allocated subcarriers having the non-zero magnitude. In some of these embodiments, the indication of the precoder vector is provided as part of a precoder codebook, the precoder codebook comprising a plurality of precoder vectors each corresponding to one of the allocated subcarriers. In some of these embodiments, the communications device is configured to receive an indication of a plurality of codebooks, to determine a total number of the plurality of allocated subcarriers, and to determine which of the received codebooks to use depending on the number of allocated subcarriers.

Figure 8:
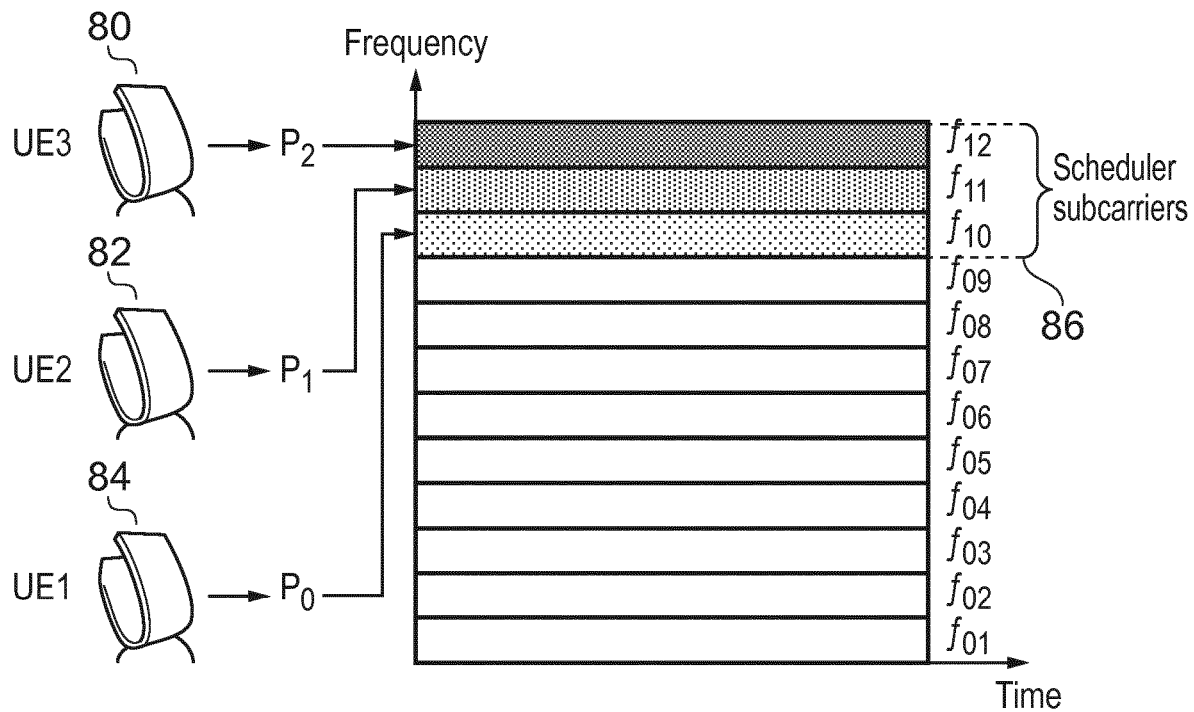
FIG. 8 illustrates an example of using a precoder to assign UEs to different subcarriers in accordance with embodiments of the present technique.

In some embodiments of the present technique, the DCI indicates which precoder within the codebook is used, e.g. by indicating the index of the codebook. In an example, we use the (example) codebook in Table I, which has 3 sets of precoders. The DCI would indicate the codebook index thereby assigning one of the 3 precoders ($P_0$, $P_1$, $P_2$) to use. For example in FIG. 8, three UEs, UE1 80, UE2 82 and UE3 84 are allocated the same 3 subcarriers $f_{10}$, $f_{11}$ & $f_{12}$ 86 for their PUSCH transmission. The DCI indicates precoder $P_0$, $P_1$ and $P_2$ to UE1, UE2 and UE3 respectively. This effectively concentrates all of the energy for UE1, UE2 and UE3 to subcarriers $f_{10}$, $f_{11}$ and $f_{12}$ respectively, thereby allowing the eNB to multiplex these three UEs in the scheduled subcarriers. In other words, in these embodiments, the precoder codebook is indicated to the communications device via the radio resource control information, and the indicated precoder vector is indicated to the communications device from among the plurality of precoder vectors of the precoder codebook via the downlink control information.

In some of the above discussed embodiments, the precoder vector to be used may be dependent on the cell ID. In other words, the communications device is configured to identify the precoder vector dependent on an ID of a cell provided by the infrastructure equipment to which the communications device is configured to transmit the uplink channel, the elements of the identified precoder vector being determined such that their multiplication by the repeated modulation symbols results in the selected one of the allocated subcarriers having the non-zero magnitude. One advantage of this approach is that the single subcarrier used is cell-dependent, allowing for a subcarrier-reuse pattern to be applied between cells.

In some embodiments of the present technique, the DCI would indicate whether modulation symbol repetition and precoding is used or not. For example, if modulation symbol repetition and precoding is not used then no precoding is applied and DCI signals a precoding vector of '11' for a 3 precoder vector codebook, referring to Table I. Alternatively if modulation symbol repetition and precoding is used, then a precoding vector other than '11' is signaled in DCI. In this example of a 3 precoder vector codebook, 2 bits are used to indicate the codebook index, e.g. 00=$P_0$, 01=$P_1$ and 10=$P_2$. The remaining state of these 2 bits can be used to disable modulation symbol repetition and precoding, i.e. 11=disable modulation symbol repetition and precoding. In other words, in these embodiments, the communications device is configured to receive an indication that one or both of the modulation symbol repetition and the precoder function should be disabled.

In some embodiments of the present technique, the UE is RRC configured with a precoder vector. That is, instead of a codebook, the UE is semi-statically assigned a precoder vector. This means that the UE would use a fixed subcarrier within its PUSCH allocation. For example, if the UE is semi-statically (i.e. RRC configured) assigned precoder $P_2$ in a 3 subcarrier PUSCH allocation, the UE would effectively use the middle subcarrier in any 3 subcarrier PUSCH allocation when modulation symbol repetition and precoding is enabled. If the DCI allocates the PUSCH to use $f_{01}, f_{02}$ & $f_{03}$, this UE will use only $f_{02}$ and if the DCI allocates the PUSCH to use $f_{07}, f_{08}$ & $f_{09}$, this UE will use only $f_{08}$. In other words, in these embodiments of the present technique, the communications device is configured to receive an indication of the precoder vector via received radio resource control information and/or received downlink control information, the elements of the indicated precoder vector being determined such that their multiplication by the repeated modulation symbols results in the selected one of the allocated subcarriers having the non-zero magnitude.

In some embodiments of the present technique, the DCI includes a bit-field for indicating the said codebook index and location of allocated subcarriers within an allocated PRB jointly. For example, for 3 subcarrier allocation, there are 4 locations of allocated subcarriers and 3 kinds of codebook index for each location within the allocated PRB. Therefore the bit-field indicates 12 different resources and consists of 4 bits. This bit-field size is fixed irrespective of the number of allocated subcarriers. Alternatively, this information can be further jointly encoded with PRB allocation information.

Given that Release-14 of the eMTC specifications support a minimum transmission bandwidth of 1 PRB, in order to support sub-PRB transmission, there needs to be some modification of DCI signaling in order to indicate the finer granularity of the sub-PRB signaling. Hence in an embodiment of the invention, the modulation symbol repetition function repeats each modulation symbol 12 times and a DCI controlled precoding weight vector has the effect of both indicating the tones to be used for the sub-PRB transmission and any further precoding operation. In this case, the DCI used for sub-PRB transmissions is the same as that used in Release-14 with the addition of a field indicating the precoding weight vector (where the number of bits required for this field is typically less than 12, e.g. 4 bits). In a further implementation, multiple modulation symbol repetition is used where each one would direct the symbols to a different non-zero magnitude subcarrier within the 12 subcarriers PRB. This would effectively enable multiple subcarriers to be used where each carries different symbols within a 12 subcarrier PRB allocation.

In some embodiments of the present technique, the precoder used changes across repetitions. That is for a repetitive transmission, the precoder is changed after every X time periods. The change in the precoder is based on a predetermined pattern, i.e. a precoder hopping pattern with a precoding hopping period of X. Hence this effectively enables the UE to frequency hop across the allocated subcarriers. In other words, in these embodiments, the precoder vector used for carrying out the precoder function is changed during the repetitions of the modulated symbols. In some of these embodiments, the precoder vector used for carrying out the precoder function is changed periodically during the repetitions of the modulated symbols.

In some arrangements, the precoder hopping pattern is UE specifically RRC configured by the network. In other arrangements, the precoder hopping pattern is indicated in the DCI, i.e. the DCI that schedules the UE. In further arrangements, the precoder hopping pattern is dependent on the cell ID. In other words, a pattern defining the change in the precoder function over the repeated transmissions of the uplink channel is indicated to the communications device by one or more of received radio resource control information, received downlink control indication, and a determination dependent on an ID of a cell provided by the infrastructure equipment to which the communications device is configured to transmit the uplink channel.

Figure 9:
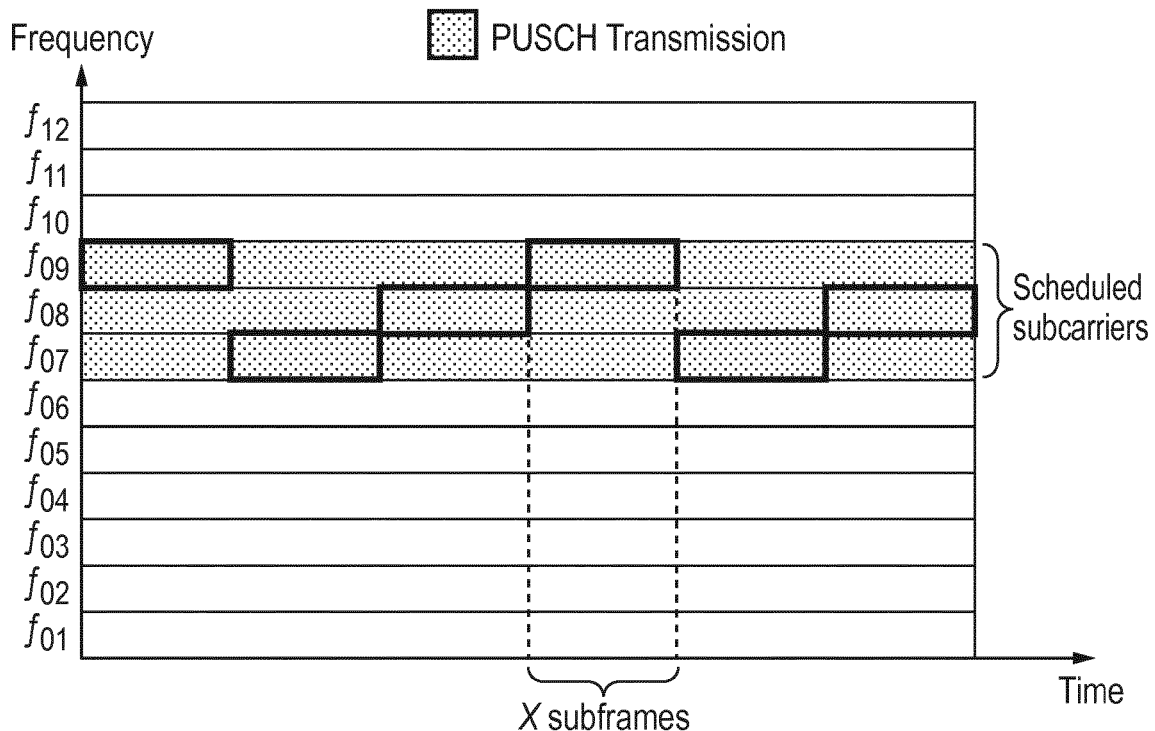
FIG. 9 illustrates an example of precoder hopping in accordance with embodiments of the present technique.

In some embodiments of the present technique, the said precoder hopping time period is a subframe, that is the UE performs a precoder hopping every X subframes. An example is shown in FIG. 9, where a UE is scheduled on subcarriers $f_{07}, f_{08}$ & $f_{09}$ and a precoder hopping pattern of $\{P_2, P_0, P_1\}$ is configured. Using this precoder hopping pattern leads to the UE performing subcarrier hopping among the 3 scheduled subcarriers as shown in FIG. 9. It should be appreciated that although in the example in FIG. 9 the precoder hops across all 3 subcarriers, it is possible that it can hop less than 3 subcarriers (e.g. 2 subcarriers) even though the allocation is 3 subcarriers. In other words, in these embodiments, the periodicity of the change of the precoder vector used for carrying out the precoder function during the repetitions of the modulated symbols is a time required to transmit one or more subframes.

In some embodiments of the present technique, the said precoder hopping time period is a Resource Unit. A Resource Unit is the length of a sub-PRB TTI. In legacy LTE, the UE's TTI is 1 subframe (1 ms). If sub-PRB transmission is used, the Resource Unit would increase the TTI length so that the transmission would have sufficient REs to contain a TBS. This increment is relative to a PRB. Since a PRB has 12 subcarriers the Resource Unit would hence increase the TTI by 12/number of subcarriers. That is if the number of subcarriers allocated is 1 then the Resource Unit would lengthen the TTI to 12 ms, for 3 subcarriers the TTI is lengthened to 4 ms and for 6 subcarriers the TTI is lengthened to 2 ms. Hence in these embodiments, the precoder is hopped every X Resource Unit TTI. That is for 3 subcarriers, this means the precoder is hopped every 4X subframes (4X ms) and for 6 subcarriers the precoder is hopped every 2X subframes (2X ms). In other words, the periodicity of the change of the precoder vector used for carrying out the precoder function during the repetitions of the modulated symbols is a transmission time interval of the communications device.

In the preceding text, the concentration has been on precoding vectors that lead to a single-tone transmission after the DFT operation, but other precoding vectors can also be applied. The following example pre-coding vector types can be applied:
 sub-carrier transmission (as per the above embodiments)
 pre-coder that shapes the transmit power of the subcarriers such that the transmit power of the subcarriers at the edge of the UE's transmit bandwidth is lower than the transmit power of the central subcarriers. Such pre-coding vectors are useful in order to control the spurious emissions from the UE (unwanted spectral energy outside the bandwidth allocated to the UE). E.g. when the UE transmits with 3 tones ($f_0, f_1, f_2$), the pre-coding weight vector can bias the transmission powers such that they are:
  $f_0$: 10% power
  $f_1$: 80% power
  $f_2$: 10% power
 pre-coder applied to enable advanced receiver functions at the eNodeB, e.g. CDMA (code division multiple access) or NOMA (non orthogonal multiple access). Such precoder weight vectors allow for the multiplexing of different UEs onto the same sets of subcarriers and for the eNodeB advanced receiver to separate those transmissions. The eNodeB is able to choose the set of pre-coder weight vectors that is appropriate for its advanced receiver algorithms.

In other words, in some embodiments of the present technique, the communications device comprises circuitry for a discrete Fourier transform, DFT, block configured either to carry out a DFT on the precoded symbols such that, at the output of the DFT, only the precoded and transformed symbols in a selected plurality of the allocated subcarriers have a non-zero magnitude, or to carry out a DFT on the repeated modulation symbols before the precoder function is carried out such that, at the output of the precoder function, only the precoded and transformed symbols in a selected plurality of the allocated subcarriers have a non-zero magnitude, wherein one of the selected plurality of the allocated subcarriers having the non-zero magnitude has a greater magnitude than others of the selected plurality of the allocated subcarriers.

In some embodiments of the present technique, the UE can indicate the precoding weight vectors that it supports (either via unicast RRC signaling, e.g. during RRC connection or reconfiguration, or via MAC or L1 signaling, e.g. as a channel quality indication report). This allows the UE to configure or reconfigure its RF transmitter to operate optimally. E.g. if the UE can restrict itself to operating with precoding weight vectors that support single tone transmissions, the UE can change the bias points of its power amplifier in order to operate with less power backoff and hence greater efficiency. In other words, in these embodiments, the communications device is configured to transmit an indication to the infrastructure equipment of one or more precoding vectors that the precoder block is able to use when carrying out the precoder function.

Figure 10:
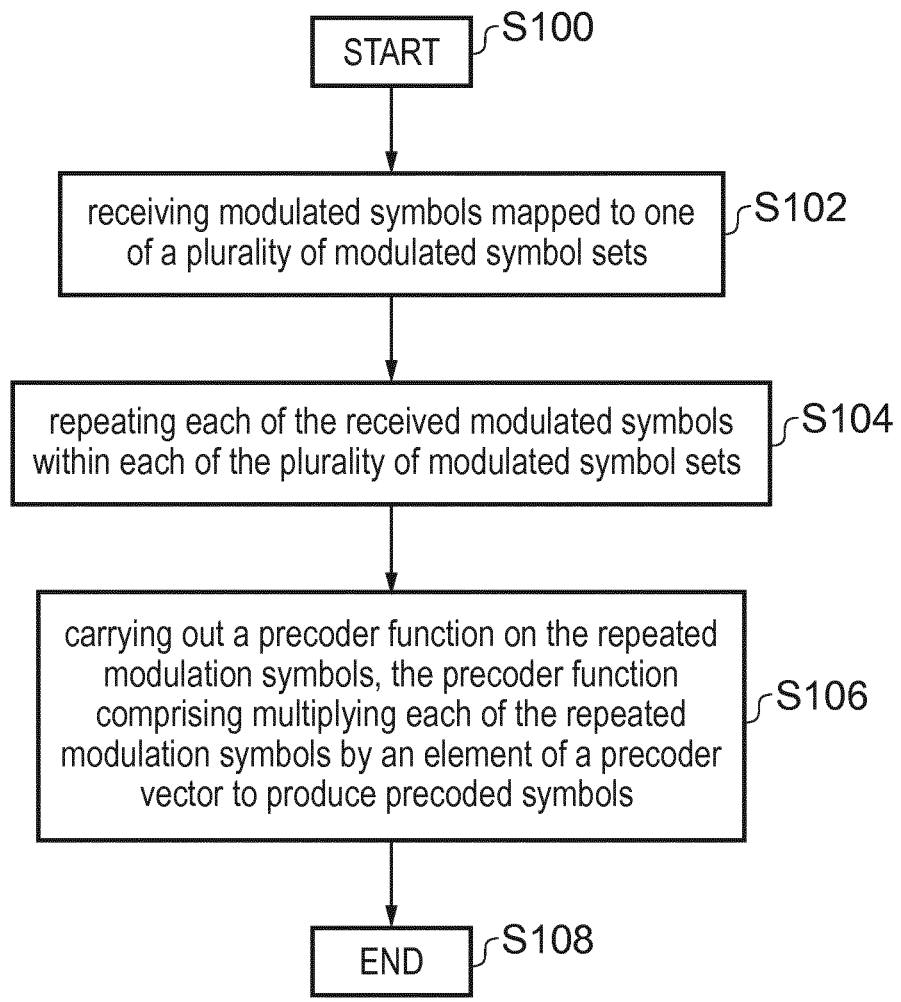
FIG. 10 shows a first flow diagram illustrating a first process of communications in a communications system in accordance with embodiments of the present technique.

FIG. 10 shows a first flow diagram illustrating a first process of communications in a communications system in accordance with embodiments of the present technique. The process is a method of operating a communications device or an infrastructure equipment. The process starts in step S100. The method comprises in step S102, receiving modulated symbols mapped to one of a plurality of modulated symbol sets. In step S104, the method comprises repeating each of the received modulated symbols within each of the plurality of modulated symbol sets. In step S106, the method comprises carrying out a precoder function on the repeated modulation symbols, the precoder function comprising multiplying each of the repeated modulation symbols by an element of a precoder vector to produce precoded symbols. The process ends in step S108.

Figure 11:
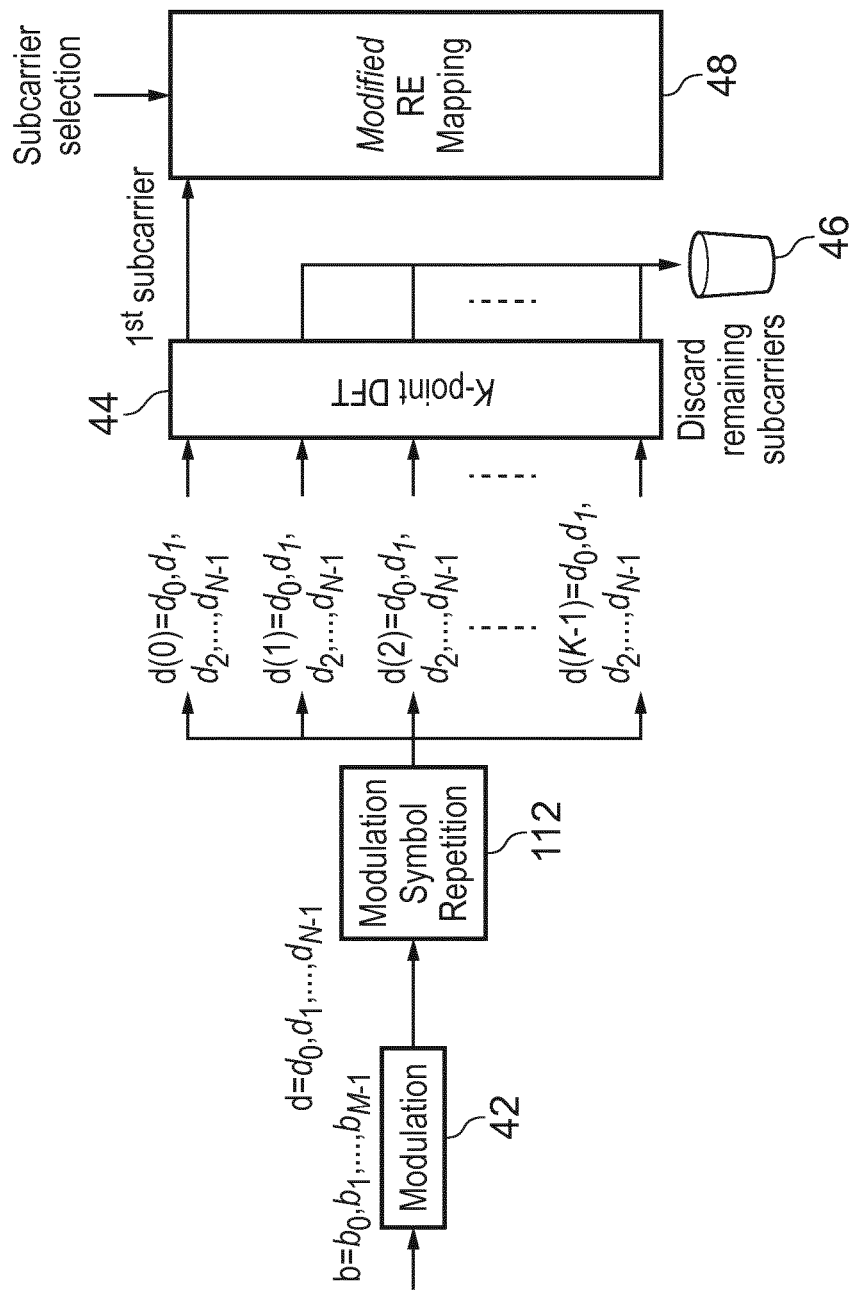
FIG. 11 schematically illustrates an exemplary process of subcarrier selection and removal in accordance with embodiments of the present technique.

Another embodiment of the present technique is shown, in an exemplary manner, in FIG. 11. Here, the RE Mapping process in FIG. 3 is modified such that the $1^{st}$ subcarrier after the modulation symbol repetition 112 and DFT processes 44 is mapped onto an indicated subcarrier 48 and the other subcarriers are removed 46. An example is shown in FIG. 11, where the output of the modulation symbols repetition function is fed into the DFT process which would produce an output where all the energy is concentrated in the $1^{st}$ subcarrier. As in this embodiment, apart from the $1^{st}$ subcarrier, all remaining subcarriers are removed. The $1^{st}$ subcarrier is fed into this modified RE Mapping process where only the symbols in the $1^{st}$ subcarrier are mapped into a selected carrier. This Subcarrier Selection function can be indicated in the DCI or signaled to the UE via RRC configuration. In other words this embodiment as shown in FIG. 11 comprises a communications device for use in a wireless communications system comprising an infrastructure equipment and the communications device, the communications device being configured to transmit an uplink channel to the infrastructure equipment in a plurality of allocated subcarriers, wherein the communications device comprises circuitry for one or more modulation symbol repetition blocks, each configured to receive modulated symbols mapped to one of a plurality of modulated symbol sets and to repeat each of the received modulated symbols within each of the plurality of modulated symbol sets, circuitry for a discrete Fourier transform, DFT, block configured to carry out a DFT on the repeated modulation symbols such that, at the output of the DFT block, only the transformed symbols in a first of the allocated subcarriers have a non-zero magnitude, and circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

Figure 12:
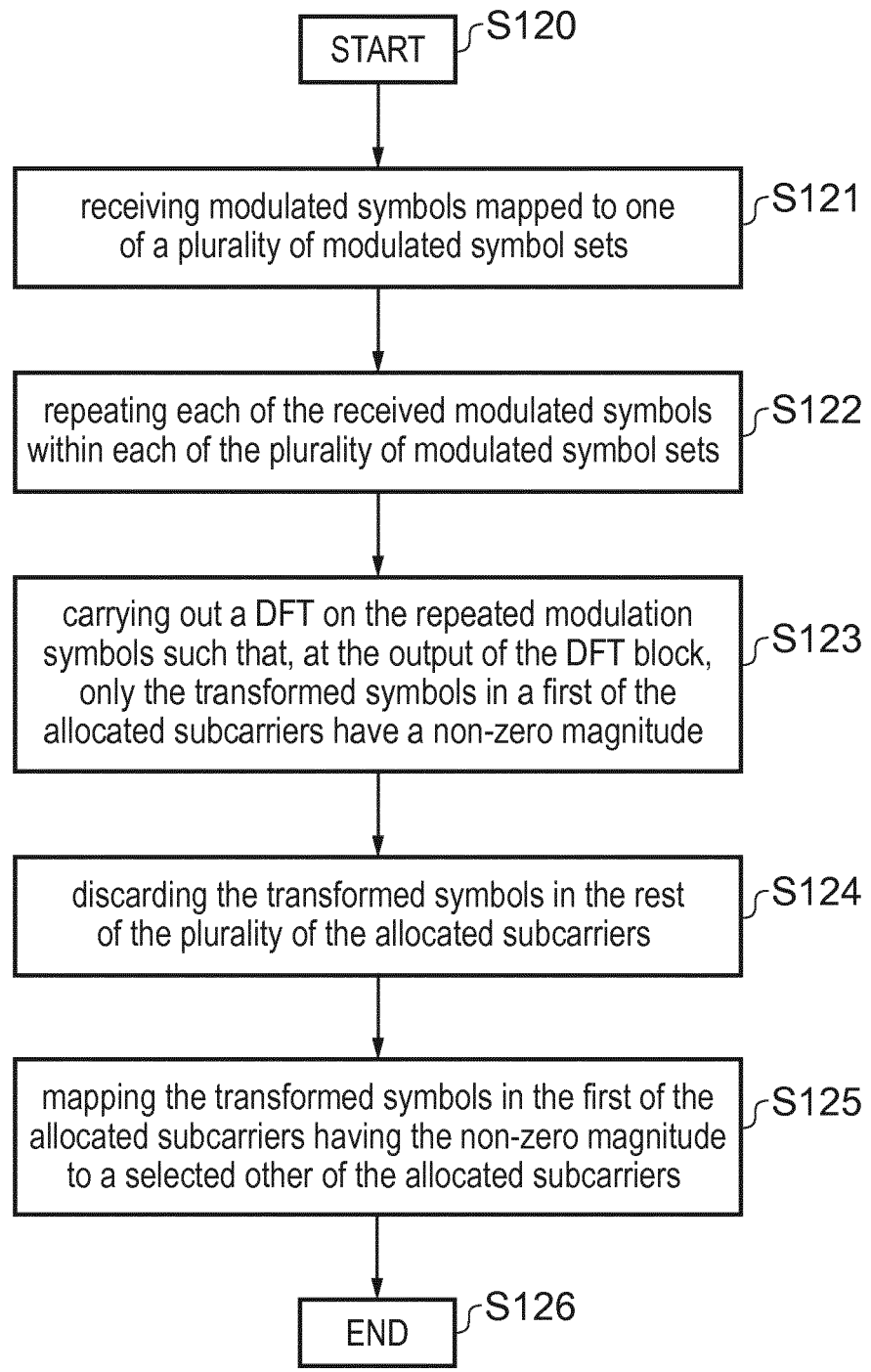
FIG. 12 shows a second flow diagram illustrating a first process of communications in a communications system in accordance with embodiments of the present technique.

FIG. 12 shows a second flow diagram illustrating a first process of communications in a communications system in accordance with embodiments of the present technique. The process is a method of operating a communications device or an infrastructure equipment. The process starts in step S120. The method comprises in step S121, receiving modulated symbols mapped to one of a plurality of modulated symbol sets. In step S122, the method comprises repeating each of the received modulated symbols within each of the plurality of modulated symbol sets. In step S123, the process comprises carrying out a DFT on the repeated modulation symbols such that, at the output of the DFT block, only the transformed symbols in a first of the allocated subcarriers have a non-zero magnitude. In step S124, the method comprises discarding the transformed symbols in the rest of the plurality of the allocated subcarriers. In step S125, the process comprises discarding the transformed symbols in the rest of the plurality of the allocated subcarriers. The process ends in step S126.

It would be appreciated that, in many arrangements of the above described wireless communications system 60, the infrastructure equipment 61 and communications device 62 comprise a transmitter (or transmitter circuitry), a receiver (or receiver circuitry), and a controller (or controller circuitry). Each of the controllers may be, for example, a microprocessor, a CPU, or a dedicated chipset, etc.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

Those skilled in the art would further appreciate that although in the examples and embodiments described in the preceding paragraphs relate to an uplink channel transmission by the communications device to the infrastructure equipment, and that the uplink channel particularly discussed is a PUSCH, embodiments of the present disclosure are equally applicable to other multi-subcarrier transmission channels in both the uplink and downlink, for example PUCCH and PDSCH. Therefore, embodiments of the present technique may relate equally to operation of a communications device/UE and an infrastructure equipment/eNodeB or the like.

The following numbered paragraphs provide further example aspects and features of the present technique:

Paragraph 1. A communications device for use in a wireless communications system comprising an infrastructure equipment and the communications device, the communications device being configured to transmit an uplink channel to the infrastructure equipment in a plurality of allocated subcarriers, wherein the communications device comprises
    circuitry for one or more modulation symbol repetition blocks, each configured to receive modulated symbols mapped to one of a plurality of modulated symbol sets and to repeat each of the received modulated symbols within each of the plurality of modulated symbol sets, and
    circuitry for a precoder block configured to carry out a precoder function on the repeated modulation symbols, the precoder function comprising multiplying each of the repeated modulation symbols by an element of a precoder vector to produce precoded symbols.

Paragraph 2. A communications device according to Paragraph 1, comprising circuitry for a discrete Fourier transform, DFT, block configured either
    to carry out a DFT on the precoded symbols such that, at the output of the DFT, only the precoded and transformed symbols in a selected one of the allocated subcarriers have a non-zero magnitude, or
    to carry out a DFT on the repeated modulation symbols before the precoder function is carried out such that, at the output of the precoder function, only the precoded and transformed symbols in a selected one of the allocated subcarriers have a non-zero magnitude.

Paragraph 3. A communications device according to Paragraph 2, wherein the communications device is configured to transmit the uplink channel comprising the precoded and transformed symbols in the selected one of the allocated subcarriers having the non-zero magnitude to the infrastructure equipment.

Paragraph 4. A communications device according to Paragraph 2 or Paragraph 3, wherein the communications device is configured to receive an indication of the precoder vector via received radio resource control information and/or received downlink control information, the elements of the indicated precoder vector being determined such that their multiplication by the repeated modulation symbols results in the selected one of the allocated subcarriers having the non-zero magnitude.

Paragraph 5. A communications device according to Paragraph 4, wherein the indication of the precoder vector is provided as part of a precoder codebook, the precoder codebook comprising a plurality of precoder vectors each corresponding to one of the allocated subcarriers.

Paragraph 6. A communications device according to Paragraph 5, wherein the communications device is configured
    to receive an indication of a plurality of codebooks,
    to determine a total number of the plurality of allocated subcarriers, and
    to determine which of the received codebooks to use depending on the number of allocated subcarriers.

Paragraph 7. A communications device according to Paragraph 5 or Paragraph 6, wherein the precoder codebook is indicated to the communications device via the radio resource control information, and the indicated precoder vector is indicated to the communications device from among the plurality of precoder vectors of the precoder codebook via the downlink control information.

Paragraph 8. A communications device according to any of Paragraphs 2 to 7, wherein the communications device is configured to identify the precoder vector dependent on an ID of a cell provided by the infrastructure equipment to which the communications device is configured to transmit the uplink channel, the elements of the identified precoder vector being determined such that their multiplication by the repeated modulation symbols results in the selected one of the allocated subcarriers having the non-zero magnitude.

Paragraph 9. A communications device according to any of Paragraphs 1 to 8, wherein the communications device is configured to receive an indication that one or both of the modulation symbol repetition and the precoder function should be disabled.

Paragraph 10. A communications device according to any of Paragraphs 1 to 9, wherein the precoder vector used for carrying out the precoder function is changed during the repetitions of the modulated symbols.

Paragraph 11. A communications device according to Paragraph 10, wherein the precoder vector used for carrying out the precoder function is changed periodically during the repetitions of the modulated symbols.

Paragraph 12. A communications device according to Paragraph 11, wherein the periodicity of the change of the precoder vector used for carrying out the precoder function during the repetitions of the modulated symbols is a time required to transmit one or more subframes.

Paragraph 13. A communications device according to Paragraph 11 or Paragraph 12, wherein the periodicity of the change of the precoder vector used for carrying out the precoder function during the repetitions of the modulated symbols is a transmission time interval of the communications device.

Paragraph 14. A communications device according to any of Paragraphs 10 to 13, wherein a pattern defining the change in the precoder function over the repeated transmissions of the uplink channel is indicated to the communications device by one or more of received radio resource control information, received downlink control indication, and a determination dependent on an ID of a cell provided by the infrastructure equipment to which the communications device is configured to transmit the uplink channel.

Paragraph 15. A communications device according to any of Paragraphs 1 to 14, comprising circuitry for a discrete Fourier transform, DFT, block configured either
- to carry out a DFT on the precoded symbols such that, at the output of the DFT, only the precoded and transformed symbols in a selected plurality of the allocated subcarriers have a non-zero magnitude, or
- to carry out a DFT on the repeated modulation symbols before the precoder function is carried out such that, at the output of the precoder function, only the precoded and transformed symbols in a selected plurality of the allocated subcarriers have a non-zero magnitude,
- wherein one of the selected plurality of the allocated subcarriers having the non-zero magnitude has a greater magnitude than others of the selected plurality of the allocated subcarriers.

Paragraph 16. A communications device according to any of Paragraphs 1 to 15, wherein the communications device is configured to transmit an indication to the infrastructure equipment of one or more precoding vectors that the precoder block is able to use when carrying out the precoder function.

Paragraph 17. A method of operating a communications device for use in a wireless communications system comprising an infrastructure equipment and the communications device, the communications device being configured to transmit an uplink channel to the infrastructure equipment in a plurality of allocated subcarriers, wherein the method comprises
- receiving modulated symbols mapped to one of a plurality of modulated symbol sets,
- repeating each of the received modulated symbols within each of the plurality of modulated symbol sets, and
- carrying out a precoder function on the repeated modulation symbols, the precoder function comprising multiplying each of the repeated modulation symbols by an element of a precoder vector to produce precoded symbols.

Paragraph 18. Circuitry for a communications device for use in a wireless communications system comprising an infrastructure equipment and the communications device, the communications device being configured to transmit an uplink channel to the infrastructure equipment in a plurality of allocated subcarriers, wherein the communications device comprises
- circuitry for one or more modulation symbol repetition blocks, each configured to receive modulated symbols mapped to one of a plurality of modulated symbol sets and to repeat each of the received modulated symbols within each of the plurality of modulated symbol sets, and
- circuitry for a precoder block configured to carry out a precoder function on the repeated modulation symbols, the precoder function comprising multiplying each of the repeated modulation symbols by an element of a precoder vector to produce precoded symbols.

Paragraph 19. An infrastructure equipment for use in a wireless communications system comprising an infrastructure equipment and the communications device, the infrastructure equipment being configured to transmit a downlink channel to the communications device in a plurality of allocated subcarriers, wherein the infrastructure equipment comprises
- circuitry for one or more modulation symbol repetition blocks, each configured to receive modulated symbols mapped to one of a plurality of modulated symbol sets and to repeat each of the received modulated symbols within each of the plurality of modulated symbol sets, and
- circuitry for a precoder block configured to carry out a precoder function on the repeated modulation symbols, the precoder function comprising multiplying each of the repeated modulation symbols by an element of a precoder vector to produce precoded symbols.

Paragraph 20. A method of operating an infrastructure equipment for use in a wireless communications system comprising an infrastructure equipment and the communications device, the infrastructure equipment being configured to transmit a downlink channel to the communications device in a plurality of allocated subcarriers, wherein the method comprises
- receiving modulated symbols mapped to one of a plurality of modulated symbol sets,
- repeating each of the received modulated symbols within each of the plurality of modulated symbol sets, and
- carrying out a precoder function on the repeated modulation symbols, the precoder function comprising multiplying each of the repeated modulation symbols by an element of a precoder vector to produce precoded symbols.

Paragraph 21. Circuitry for an infrastructure equipment for use in a wireless communications system comprising an infrastructure equipment and the communications device, the infrastructure equipment being configured to transmit a downlink channel to the communications device in a plurality of allocated subcarriers, wherein the infrastructure equipment comprises
- circuitry for one or more modulation symbol repetition blocks, each configured to receive modulated symbols mapped to one of a plurality of modulated symbol sets and to repeat each of the received modulated symbols within each of the plurality of modulated symbol sets, and
- circuitry for a precoder block configured to carry out a precoder function on the repeated modulation symbols, the precoder function comprising multiplying each of the repeated modulation symbols by an element of a precoder vector to produce precoded symbols.

Paragraph 22. A communications device for use in a wireless communications system comprising an infrastructure equipment and the communications device, the communications device being configured to transmit an uplink channel to the infrastructure equipment in a plurality of allocated subcarriers, wherein the communications device comprises
- circuitry for one or more modulation symbol repetition blocks, each configured to receive modulated symbols mapped to one of a plurality of modulated symbol sets and to repeat each of the received modulated symbols within each of the plurality of modulated symbol sets,
- circuitry for a discrete Fourier transform, DFT, block configured to carry out a DFT on the repeated modulation symbols such that, at the output of the DFT block, only the transformed symbols in a first of the allocated subcarriers have a non-zero magnitude, and
- circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

Paragraph 23. A method of operating a communications device for use in a wireless communications system comprising an infrastructure equipment and the communications device, the communications device being configured to transmit an uplink channel to the infrastructure equipment in a plurality of allocated subcarriers, wherein the method comprises receiving modulated symbols mapped to one of a plurality of modulated symbol sets, repeating each of the received modulated symbols within each of the plurality of modulated symbol sets, carrying out a DFT on the repeated modulation symbols such that, at the output of the DFT block, only the transformed symbols in a first of the allocated subcarriers have a non-zero magnitude, discarding the transformed symbols in the rest of the plurality of the allocated subcarriers, and mapping the transformed symbols in the first of the allocated subcarriers having the non-zero magnitude to a selected other of the allocated subcarriers.

Paragraph 24. Circuitry for a communications device for use in a wireless communications system comprising an infrastructure equipment and the communications device, the communications device being configured to transmit an uplink channel to the infrastructure equipment in a plurality of allocated subcarriers, wherein the communications device comprises circuitry for one or more modulation symbol repetition blocks, each configured to receive modulated symbols mapped to one of a plurality of modulated symbol sets and to repeat each of the received modulated symbols within each of the plurality of modulated symbol sets, circuitry for a discrete Fourier transform, DFT, block configured to carry out a DFT on the repeated modulation symbols such that, at the output of the DFT block, only the transformed symbols in a first of the allocated subcarriers have a non-zero magnitude, circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

Paragraph 25. An infrastructure equipment for use in a wireless communications system comprising an infrastructure equipment and the communications device, the infrastructure equipment being configured to transmit a downlink channel to the communications device in a plurality of allocated subcarriers, wherein the infrastructure equipment comprises circuitry for one or more modulation symbol repetition blocks, each configured to receive modulated symbols mapped to one of a plurality of modulated symbol sets and to repeat each of the received modulated symbols within each of the plurality of modulated symbol sets, circuitry for a discrete Fourier transform, DFT, block configured to carry out a DFT on the repeated modulation symbols such that, at the output of the DFT block, only the transformed symbols in a first of the allocated subcarriers have a non-zero magnitude, and circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

Paragraph 26. A method of operating an infrastructure equipment for use in a wireless communications system comprising an infrastructure equipment and the communications device, the infrastructure equipment being configured to transmit a downlink channel to the communications device in a plurality of allocated subcarriers, wherein the method comprises receiving modulated symbols mapped to one of a plurality of modulated symbol sets, repeating each of the received modulated symbols within each of the plurality of modulated symbol sets, carrying out a DFT on the repeated modulation symbols such that, at the output of the DFT block, only the transformed symbols in a first of the allocated subcarriers have a non-zero magnitude, discarding the transformed symbols in the rest of the plurality of the allocated subcarriers, and mapping the transformed symbols in the first of the allocated subcarriers having the non-zero magnitude to a selected other of the allocated subcarriers.

Paragraph 27. Circuitry for an infrastructure equipment for use in a wireless communications system comprising an infrastructure equipment and the communications device, the infrastructure equipment being configured to transmit a downlink channel to the communications device in a plurality of allocated subcarriers, wherein the infrastructure equipment comprises circuitry for one or more modulation symbol repetition blocks, each configured to receive modulated symbols mapped to one of a plurality of modulated symbol sets and to repeat each of the received modulated symbols within each of the plurality of modulated symbol sets, circuitry for a discrete Fourier transform, DFT, block configured to carry out a DFT on the repeated modulation symbols such that, at the output of the DFT block, only the transformed symbols in a first of the allocated subcarriers have a non-zero magnitude, circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sept. 19-22, 2016.

[2] RP-161901, "Revised work item proposal: Enhancements of NB-IoT," Huawei, HiSilicon, 3GPP TSG RAN Meeting #73, New Orleans, USA, Sep. 19-22, 2016.

[3] RP-170732, "New WID on Even further enhanced MTC for LTE," Ericsson, Qualcomm, 3GPP TSG RAN Meeting #75, Dubrovnik, Croatia, Mar. 6-9, 2017.

[4] RP-170852, "New WID on Further NB-IoT enhancements," Huawei, HiSilicon, Neul, 3GPP TSG RAN Meeting #75, Dubrovnik, Croatia, Mar. 6-9, 2017.

[5] Holma H. and Toskala A, "LTE for UMTS OFDMA and SC-FDMA based radio access," John Wiley and Sons, 2009.

[6] R1-1714108, "PUSCH Spectral Efficiency Solution Analysis," Siena Wireless, 3GPP TSG RAN WG1 Meeting #90, Prague, Czech Republic, Aug. 21-25, 2017.

What is claimed is:

1. A communications device for use in a wireless communications system comprising an infrastructure equipment and the communications device, the communications device being configured to transmit an uplink channel to the infrastructure equipment in a plurality of allocated subcarriers, wherein the communications device comprises
    circuitry for one or more modulation symbol repetition blocks, each configured to receive modulated symbols mapped to one of a plurality of modulated symbol sets and to repeat each of the received modulated symbols within each of the plurality of modulated symbol sets, and
    circuitry for a precoder block configured to carry out a precoder function on the repeated modulation symbols, the precoder function comprising multiplying each of the repeated modulation symbols by an element of a precoder vector to produce precoded symbols.

2. A communications device according to claim 1, comprising circuitry for a discrete Fourier transform, DFT, block configured either
    to carry out a DFT on the precoded symbols such that, at the output of the DFT, only the precoded and transformed symbols in a selected one of the allocated subcarriers have a non-zero magnitude, or
    to carry out a DFT on the repeated modulation symbols before the precoder function is carried out such that, at the output of the precoder function, only the precoded and transformed symbols in a selected one of the allocated subcarriers have a non-zero magnitude.

3. A communications device according to claim 2, wherein the communications device is configured to transmit the uplink channel comprising the precoded and transformed symbols in the selected one of the allocated subcarriers having the non-zero magnitude to the infrastructure equipment.

4. A communications device according to claim 2, wherein the communications device is configured to receive an indication of the precoder vector via received radio resource control information and/or received downlink control information, the elements of the indicated precoder vector being determined such that their multiplication by the repeated modulation symbols results in the selected one of the allocated subcarriers having the non-zero magnitude.

5. A communications device according to claim 4, wherein the indication of the precoder vector is provided as part of a precoder codebook, the precoder codebook comprising a plurality of precoder vectors each corresponding to one of the allocated subcarriers.

6. A communications device according to claim 5, wherein the communications device is configured
    to receive an indication of a plurality of codebooks,
    to determine a total number of the plurality of allocated subcarriers, and
    to determine which of the received codebooks to use depending on the number of allocated subcarriers.

7. A communications device according to claim 5, wherein the precoder codebook is indicated to the communications device via the radio resource control information, and the indicated precoder vector is indicated to the communications device from among the plurality of precoder vectors of the precoder codebook via the downlink control information.

8. A communications device according to claim 2, wherein the communications device is configured to identify the precoder vector dependent on an ID of a cell provided by the infrastructure equipment to which the communications device is configured to transmit the uplink channel, the elements of the identified precoder vector being determined such that their multiplication by the repeated modulation symbols results in the selected one of the allocated subcarriers having the non-zero magnitude.

9. A communications device according to claim 1, wherein the communications device is configured to receive an indication that one or both of the modulation symbol repetition and the precoder function should be disabled.

10. A communications device according to claim 1, wherein the precoder vector used for carrying out the precoder function is changed during the repetitions of the modulated symbols.

11. A communications device according to claim 10, wherein the precoder vector used for carrying out the precoder function is changed periodically during the repetitions of the modulated symbols.

12. A communications device according to claim 11, wherein the periodicity of the change of the precoder vector used for carrying out the precoder function during the repetitions of the modulated symbols is a time required to transmit one or more subframes.

13. A communications device according to claim 11, wherein the periodicity of the change of the precoder vector used for carrying out the precoder function during the repetitions of the modulated symbols is a transmission time interval of the communications device.

14. A communications device according to claim 10, wherein a pattern defining the change in the precoder function over the repeated transmissions of the uplink channel is indicated to the communications device by one or more of received radio resource control information, received downlink control indication, and a determination dependent on an ID of a cell provided by the infrastructure equipment to which the communications device is configured to transmit the uplink channel.

15. A communications device according to claim 1, comprising circuitry for a discrete Fourier transform, DFT, block configured either
to carry out a DFT on the precoded symbols such that, at the output of the DFT, only the precoded and transformed symbols in a selected plurality of the allocated subcarriers have a non-zero magnitude, or
to carry out a DFT on the repeated modulation symbols before the precoder function is carried out such that, at the output of the precoder function, only the precoded and transformed symbols in a selected plurality of the allocated subcarriers have a non-zero magnitude,
wherein one of the selected plurality of the allocated subcarriers having the non-zero magnitude has a greater magnitude than others of the selected plurality of the allocated subcarriers.

16. A communications device according to claim 1, wherein the communications device is configured to transmit an indication to the infrastructure equipment of one or more precoding vectors that the precoder block is able to use when carrying out the precoder function.

17. An infrastructure equipment for use in a wireless communications system comprising an infrastructure equipment and the communications device, the infrastructure equipment being configured to transmit a downlink channel to the communications device in a plurality of allocated subcarriers, wherein the infrastructure equipment comprises
circuitry for one or more modulation symbol repetition blocks, each configured to receive modulated symbols mapped to one of a plurality of modulated symbol sets and to repeat each of the received modulated symbols within each of the plurality of modulated symbol sets, and
circuitry for a precoder block configured to carry out a precoder function on the repeated modulation symbols, the precoder function comprising multiplying each of the repeated modulation symbols by an element of a precoder vector to produce precoded symbols.

18. A communications device for use in a wireless communications system comprising an infrastructure equipment and the communications device, the communications device being configured to transmit an uplink channel to the infrastructure equipment in a plurality of allocated subcarriers, wherein the communications device comprises
circuitry for one or more modulation symbol repetition blocks, each configured to receive modulated symbols mapped to one of a plurality of modulated symbol sets and to repeat each of the received modulated symbols within each of the plurality of modulated symbol sets,
circuitry for a discrete Fourier transform, DFT, block configured to carry out a DFT on the repeated modulation symbols such that, at the output of the DFT block, only the transformed symbols in a first of the allocated subcarriers have a non-zero magnitude, and
circuitry for a mapping block configured to receive only the transformed symbols in the first of the allocated subcarriers having the non-zero magnitude, and to map the transformed symbols in the first of the allocated subcarriers having the non-zero magnitude to a selected other of the allocated subcarriers.

* * * * *